(12) United States Patent
Smith

(10) Patent No.: US 6,222,965 B1
(45) Date of Patent: Apr. 24, 2001

(54) BIAS CONTROL SYSTEM FOR ELECTROOPTIC DEVICES

(75) Inventor: Robert W. Smith, Allentown, PA (US)

(73) Assignee: Agere Systems Opto Electronics Guardian Inc., Miami Lakes, FL (US)

( * ) Notice: Subject to any disclaimer, the term of this patent is extended or adjusted under 35 U.S.C. 154(b) by 0 days.

(21) Appl. No.: 09/349,736

(22) Filed: Jul. 8, 1999

(51) Int. Cl.[7] .................................................. G02B 6/26
(52) U.S. Cl. .............................. 385/40; 385/41; 385/42; 385/44; 385/46; 385/47
(58) Field of Search .................................. 385/40, 41, 42, 385/44, 46, 47, 48, 49

(56) References Cited

U.S. PATENT DOCUMENTS

| | | | |
|---|---|---|---|
| 5,278,923 | * | 1/1994 | Nazarathy et al. ................ 385/3 |
| 5,359,449 | * | 10/1994 | Nishimoto et al. .............. 359/181 |
| 5,422,966 | * | 6/1995 | Gopalakrishnan et al. ......... 385/2 |

* cited by examiner

Primary Examiner—Mohammad Sikder
(74) Attorney, Agent, or Firm—Stroock & Stroock & Lavan LLP

(57) ABSTRACT

An optical device includes a substrate formed of an electrooptic material, a waveguide formed in the substrate, an electrically conductive film formed over at least a portion of the waveguide and a source of DC voltage electrically connected to the film for thermally inducing a change in the optical refractive index of the substrate of the optical device.

10 Claims, 4 Drawing Sheets

BIAS CONTROL SYSTEM FOR ELECTROOPTIC DEVICES

BACKGROUND OF THE INVENTION

The invention generally relates to the field of electrooptic devices, and more particularly, to the biasing system of integrated electrooptic devices, for example, waveguide modulators made of electrooptic material, such as lithium niobate.

Transmission of data using optical carriers enables very high bandwidths and numbers of multiplexed channels with low signal loss and distortion. A coherent laser light beam is amplitude modulated with a data signal, and propagates to a remote receiver either directly through the atmosphere, or via a system of optical fibers and repeaters. The light beam may advantageously be modulated with electrical signals in the microwave frequency range using an electrooptic modulator such as a Mach-Zehnder modulator or an optical directional coupler. These modulators may be optical intensity modulators, switches, phase or frequency shifters, polarization transformers, wavelength filters, and the like. A class of these modulators are made of ferroelectric materials, such as z-cut lithium niobate ($LiNbO_3$) or lithium tantalate ($LiTaO_3$).

An electrooptic modulator based on a Mach-Zehnder interferometer generally includes a substrate having an optical waveguide formed therein having two arms or branches that extend generally in parallel with each other and have approximately equal lengths. The index of refraction of the material in the waveguide is higher than the index of refraction of the material of the substrate. In the absence of an applied electrical bias voltage, an input optical beam produced by a laser or the like applied to the waveguide divides equally between the branches into two beams, which propagate through the separate branches and recombine at the optical output of the waveguide in phase with each other to produce an optical output signal that is essentially similar to the optical input signal.

Optical modulators use the electrooptic effect to modulate an input light wave in amplitude according to an input signal. These optical modulators are designed to have an operating point that is optimally set by the application of an appropriate predetermined bias voltage. When a bias voltage is applied to one branch of the waveguide, it causes the indice of refraction of that branch's material to vary due to the electrooptic effect, such that the effective optical length of that branch varies as compared to the branch that is not subjected to the bias voltage.

For example, at a bias voltage known in the art as $V_\pi$, the effective optical lengths of the branches vary to such an extent that the optical signals emerging from the branches are 180° out of phase with each other. Therefore, amplitudes of the signals combine to cancel each other out and produce a zero output at the optical output. For most optical communication applications, the modulator is biased at a voltage $V_\pi/2$. Device instabilities and environmental effects, especially temperature variations, however, cause the operating point to drift, and require constant readjustment to maintain the proper operating point.

For this reason, the temperature dependence of modulators has been viewed as an operational shortcoming to be minimized. For example, to compensate for variations due to temperature, prior art devices use a feedback control circuit to provide more reliable control of the bias voltage applied to the optical modulator. See, e.g., U.S. Pat. No. 5,742,268 (Noda) and U.S. Pat. No. 5,003,624 (Terbrack et al.), the specifications of which are incorporated herein by reference. Further, in the case of z-cut $LiNbO_3$ crystals, which are particularly sensitive to temperature variations, prior art constructions reduced temperature sensitivity by coating the modulator with an insulating film. See, e.g., U.S. Pat. No. 5,388,170 (Heismann et al.), the specification of which is incorporated herein by reference.

The stability of lithium niobate modulators, in particular, has been observed based on the application of a voltage, which is monitored throughout the lifetime of the device under test. It has been observed that over long periods of time the absolute magnitude of the bias voltage increases in an approximately linear fashion. This increase in starting bias voltage is attributed to a screening effect caused by the creation of an electric field in the substrate material when voltage is applied. In practice, as the bias voltage increases, it becomes increasingly difficult to control the modulator. As a result, the generated bias voltage becomes fixed at the upper or lower limit, which causes the modulated light output from the optical modulator to be distorted. To prevent this distortion, the end of the modulator life is typically set at the point at which the starting bias voltage reaches the maximum value of the power supply or simply the point at which the starting bias voltage reaches a multiplicative factor of the initial starting bias voltage. For example, the end of life can be defined when the starting bias voltage of a modulator having an initial starting bias of four volts reaches eight volts.

Further background material concerning the physics of ferroelectric crystals may be found in a number of references including books by Charles Kittel, *Introduction to Solid State Physics*, John Wiley and Sons, Inc., New York (1971) and Ivan P. Kaminov, *An Introduction to Electrooptic Devices*, Academy Press, Inc., Orlando (1974), both of which are incorporated herein by reference. Additional information on the processing of $LiNbO_3$ may be found in the book chapter by S. K. Korotky and R. C. Alfeness, titled: "Ti:$LiNbO_3$ Integrated Optic Technology" in *Integrated Optical Circuits and Components*, 169–227, Marcel Dekker, Inc., New York (L. D. Hutcheson ed. 1987), which is also incorporated herein by reference.

SUMMARY OF THE INVENTION

The present invention is directed at overcoming the shortcomings of the prior art. An optical device is provided that includes a substrate formed of an electrooptic material and a waveguide formed in the substrate. An electrode is formed over at least a portion of the waveguide and is electrically connected to a source of DC voltage. The electrode can have an inherent resistance that induces a thermal change in the optical refractive index of the substrate when a DC voltage is applied to the electrode to control the operating point of the optical device. By calibrating the amount of heat necessary to induce a change in the refractive index, the operating point of an integrated electrooptic device can be controlled. In a second embodiment, an RF electrode can be formed over at least part of the waveguide to electrooptically induce a change in the refractive index and a DC electrode can be formed over at least a second part of the waveguide to thermally induce a change in the refractive index of the substrate material.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Generally speaking, in accordance with the present invention, an electrooptic device having a substrate is provided that thermally induces a change in the optical refractive index of the substrate of the optical device to control the operating point of the electrooptic device.

Figure 1:
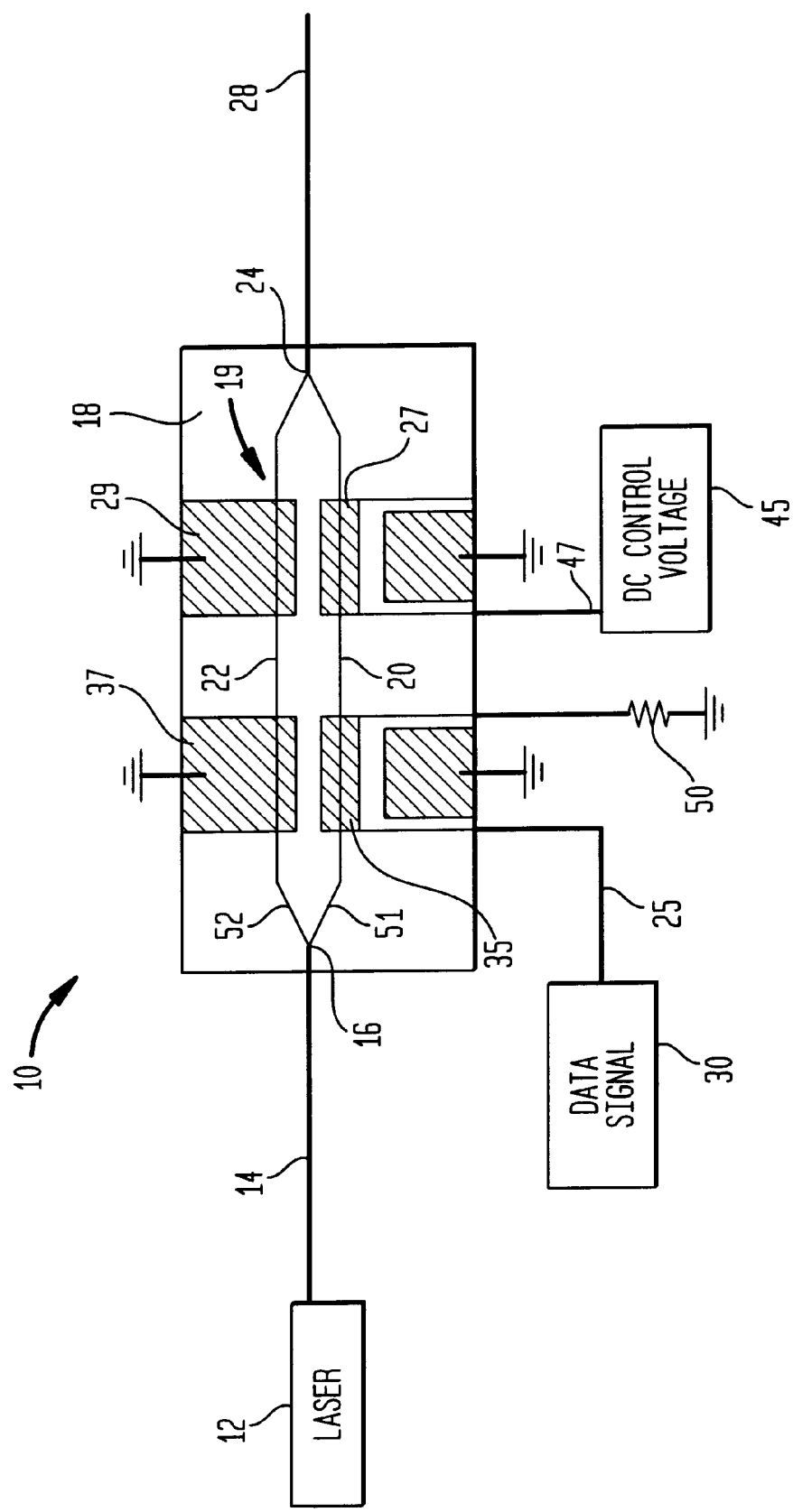
FIG. 1 is a schematic representation of a conventional dual path modulator.

FIG. 1 depicts a schematic representation of one example of a conventional electrooptic device, a Mach-Zehnder-type, interferometric waveguide modulator 10 having a substrate 18. Modulator 10 has a waveguide 19, having two branches 20 and 22, formed in substrate 18 and an electrically conductive film 35 formed over at least a portion of waveguide 19. Waveguide 19 receives a coherent light beam in the form of an optical signal S from laser 12 through an optical fiber 14 connected to waveguide 19 at optical input 16. Branches 20 and 22 extend from optical input 16 and combine at an optical output 24. Thus, the optical signal produced by laser 12 propagates through fiber 14 to optical input 16, where the optical signal split into two portions, $S_1$, which travels through branch 20, and $S_2$, which travels through branch 22. In the absence of any modulation, the two signals recombine at optical output 24 in a signal nearly identical to the optical signal provided to optical input 16 and are output at an optical fiber 28 to a remote receiver (not shown).

Modulator 10 also may include a DC electrode 29 that includes a second electrically conductive film 27 formed over at least a portion of waveguide 19, which is spaced apart along waveguide 19 from first electrically conductive film 35. A DC control voltage 45 is applied via line 45 to conductive film 27 to modulate signal portion $S_1$ by biasing modulator 10 at a linear operating point corresponding to the voltage $V\pi/2$. To modulate signal portion Si, an electrical data (RF) signal 30 is applied to branch 20 via an electrical input line 25 to an electrically conductive film 35. As is known in the art, the application of RF or AC signal 30 to RF electrode 37 electrooptically induces a local change in the refractive index within the wave-guiding region of substrate 18. The change in refractive index is directly proportional to the strength of the applied electric field. That is, the optical signal is phase modulated by inputting an RF signal at electrode 35. The very fast response time of the electrooptic effect makes it well-suited for high-speed modulator operation.

It has been discovered, however, that it is not necessary to exclusively use the electrooptic effect for low-speed or bias-control applications. Rather than using the electrooptic effect for bias control applications, for example, the operating point of optic devices may be controlled by thermally inducing a change in refractive index (An) by locally heating the substrate. Alternatively, a change in refractive index can be provided by combining the effects of electrooptic induction and thermal induction.

The preferred embodiment of the present invention will now be discussed in detail. While specific features, configurations and arrangements are discussed, it should be understood that this is done for illustration purposes only. A person skilled in the relevant art will recognize that other steps, configurations and arrangements may be used without departing from the spirit and scope of the invention.

Figure 2:
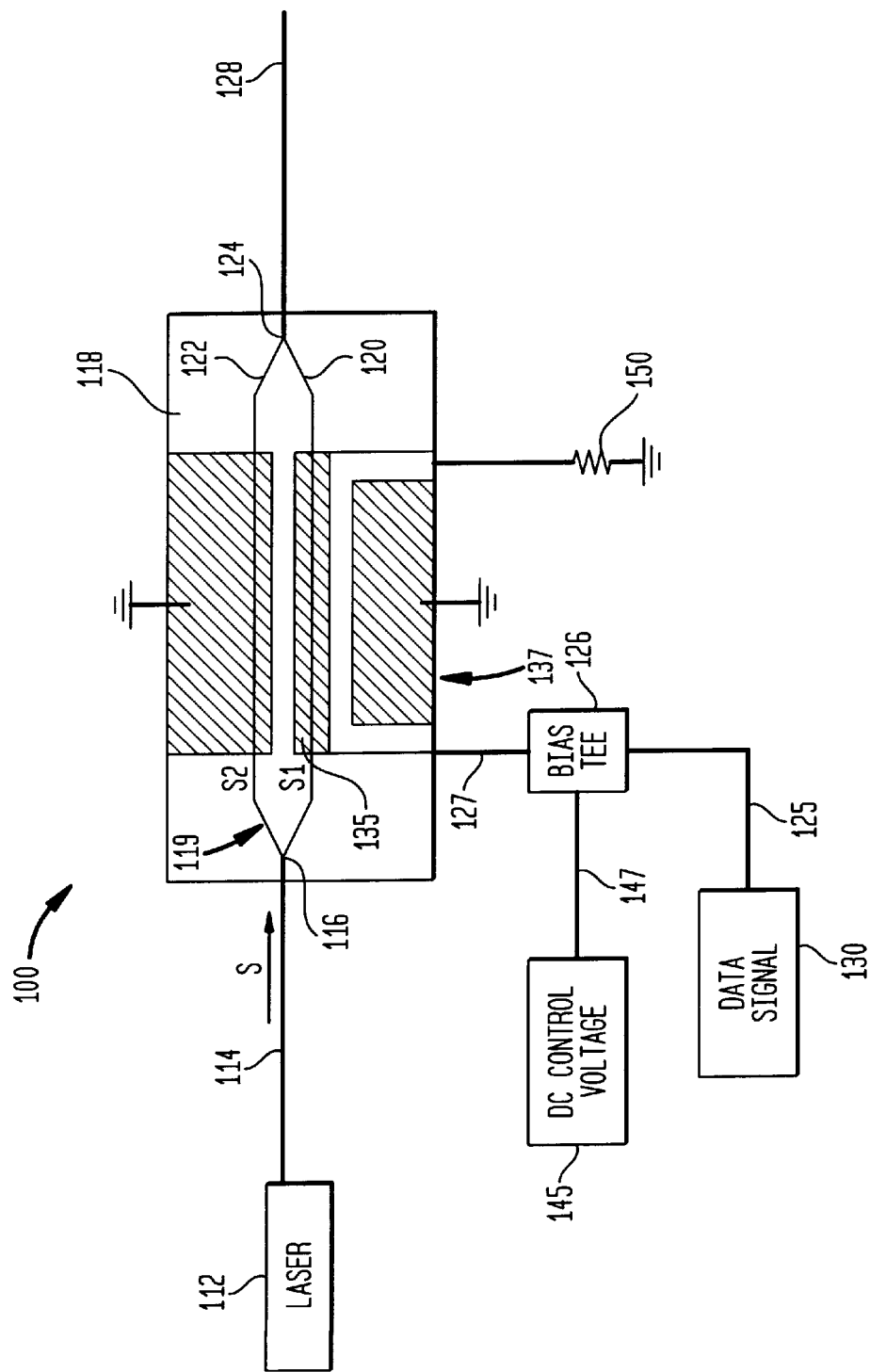
FIG. 2 is a schematic representation of a modulator constructed in accordance with an embodiment of the present invention.

Referring to FIG. 2, one example of an electrooptic device of the present invention, a modulator 100, is depicted. Modulator 100 is constructed similarly to the conventional modulator 10 of FIG. 1, and is formed of an electrooptic material, such as, by way of non-limiting example, lithium niobate, lithium tantalate, gallium arsenide, amino phenylene, and/or isophorine isoxazolone ("APII") polymers. Those skilled in the art will recognize that the principles discussed herein are equally applicable to other electrooptic devices, such as, by way of non-limiting example, polarization modulators, cut-off modulators, Fabry-Perot modulators and directional couplers.

Modulator 100 includes a substrate 118 and a laser 112. Modulator 100 has a waveguide 119, having two branches 120 and 122, formed in substrate 118 and an electrically conductive film 135 formed over at least a portion of waveguide 119. Waveguide 119 receives a coherent light beam in the form of an optical signal S from laser 112 through an optical fiber 114 connected to waveguide 119 at optical input 116. Branches 120 and 122 extend from optical input 116 and combine at an optical output 124. Thus, the optical signal produced by laser 112 propagates through fiber 114 to optical input 116, where the optical signal split into two portions, $S_1$, which travels through branch 120, and $S_2$, which travels through branch 122. In the absence of any modulation, the two signals recombine at optical output 124 in a signal nearly identical to the optical signal provided to optical input 116 and are output at an optical fiber 128 to a remote receiver (not shown).

To modulate signal portion SI, an electrical data (RF) signal 130 is applied to branch 120 via an electrical input line 125 and a bias tee 126 to electrically conductive film 135. In a preferred embodiment, as is shown in FIG. 2, film 135 may be formed as the center conductor of an RF electrode 137. RF electrode 137 can take the form of a coplanar waveguide microwave structure, depicted in FIG. 2, and may be terminated in a resistor 150 to provide high-speed performance. Alternatively, by way of non-limiting example, RF electrode 137 may take the form of a stripline structure or an asymmetric structure.

Signal portion $S_1$ is optimally modulated with data signal 130 by biasing modulator 100 at a linear operating point corresponding to the voltage $V\pi/2$. As is known in the art, the application of RF or AC signal 130 to RF electrode 137 electrooptically induces a local change in the refractive index of substrate 118. The change in refractive index is directly proportional to the strength of the applied electric field.

Rather than relying on the electrooptically induced change in the refractive index, a thermally induced change can also advantageously be used to either supplement or supplant the electrooptic effect. Referring to FIG. 2, a DC control voltage 145 may be coupled to bias tee 126 via DC input 147, where DC control voltage 145 is combined with data signal 130 and output to RF electrode 137 as combined signal 127. In a preferred embodiment, DC control voltage 145 can be resistively or inductively coupled to bias tee 126.

When combined signal 127 is applied to RF electrode 137, the DC portion of the combined signal is dissipated as heat by the inherent resistance of RF electrode 137. This heat is absorbed by substrate 118 in the area surrounding RF electrode 137, thereby causing a thermally induced local change in the refractive index of the substrate material. Through temperature coefficients, the local change in refractive index of modulator 118 is directly proportional to the Joule heating that occurs in the inherent resistance of RF electrode 137. By calibrating the amount of heat necessary to induce a change the refractive index, the operating point of modulator 100 can be controlled.

Figure 3:
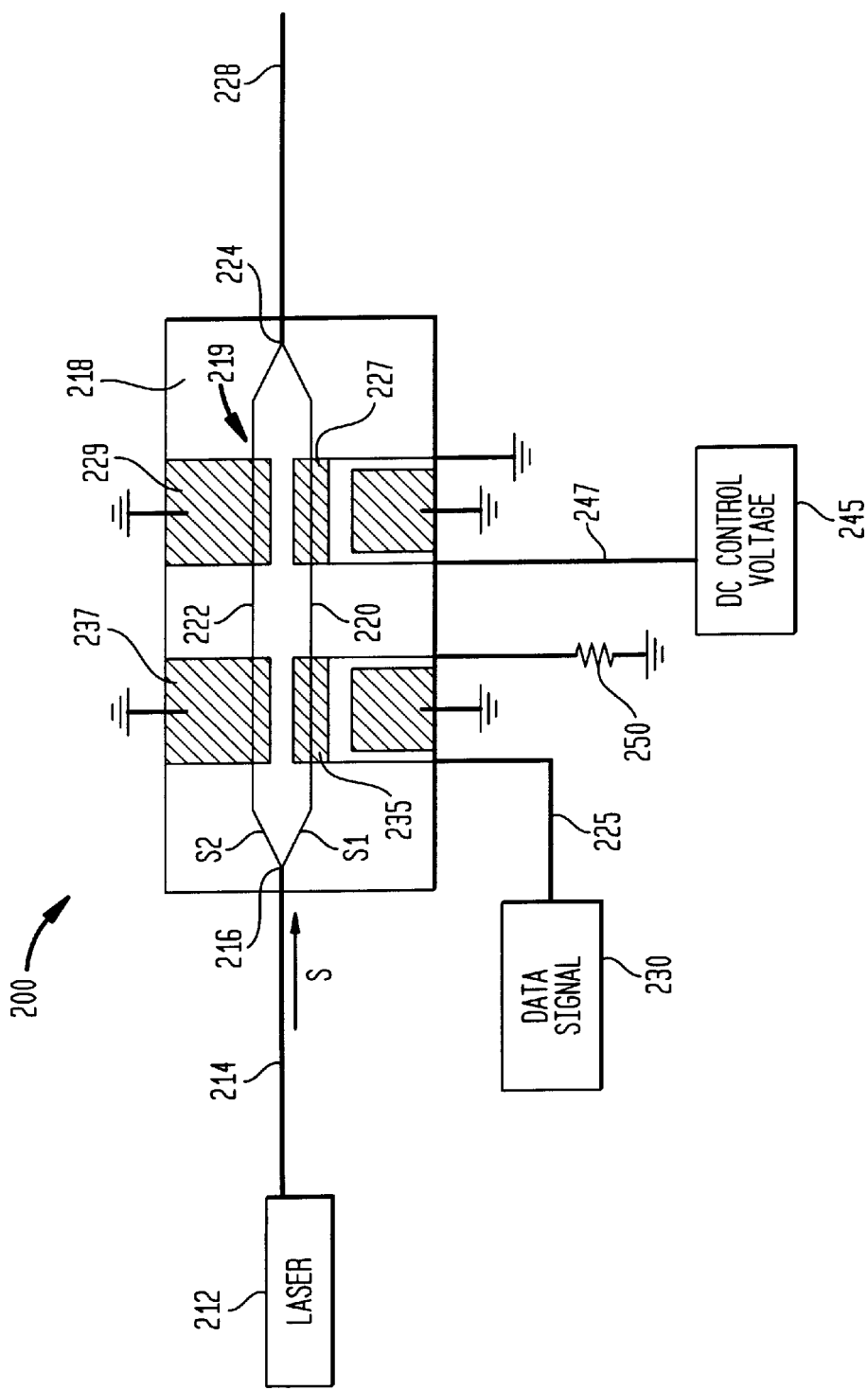
FIG. 3 is a schematic representation view of a modulator constructed in accordance with a second embodiment of the present invention.

Referring to FIG. 3, a second embodiment of the invention is schematically depicted, where an example of an electrooptic device constructed in accordance with the invention, modulator 200, is depicted. Modulator 200 differs from modulator 100 depicted in FIG. 2 in that separate RF and DC electrodes are provided to respectively create the electrooptic and thermal sources of refractive index change. As such, the need for bias tee 126 is not required to combine the RF and DC signals.

Referring to FIG. 3, modulator 200 includes a substrate 218 and a laser 212. Modulator 200 has a waveguide 219, having two branches 220 and 222, formed in substrate 218 and a first electrically conductive film 235 formed over at least a portion of waveguide 219. Waveguide 219 receives a coherent light beam in the form of an optical signal S from laser 212 through an optical fiber 214 connected to waveguide 219 at optical input 216. Branches 220 and 222 extend from optical input 216 and combine at an optical output 224. Thus, optical signal S produced by laser 212 propagates through fiber 214 to optical input 216, where the optical signal split into two portions, $S_1$, which travels through branch 220, and $S_2$, which travels through branch 222. In the absence of any modulation, the two signals recombine at optical output 224 in a signal nearly identical to the optical signal provided to optical input 216 and are output at an optical fiber 228 to a remote receiver (not shown).

Modulator 200 includes a second electrically conductive film 227 formed over at least a portion of waveguide 219, which is spaced apart along waveguide 219 from first electrically conductive film 235. In a preferred embodiment, first film 235 may be formed as an RF electrode 237 and second film 227 may be formed as a DC electrode 229. RF electrode 237 and DC electrode 229 can take the form of the coplanar waveguide microwave structure, depicted in FIG. 3. As in the first embodiment, RF electrode 237 may be terminated in a resister 250 to provide high-speed performance. As is shown in FIG. 3, the output end of the DC electrode is grounded, thus allowing current to be drawn. The resulting current flow heats the substrate 218 thereby thermally inducing a change in refractive index. Alternatively, by way of non-limiting example, RF electrode 237 and DC electrode 229 may take the form of a stripline electrode structure or an asymmetric electrode structure.

In this manner, as in the first embodiment, optical signal S can be modulated by means of an electrooptically induced change in the refractive index and/or a thermally induced change. Referring to FIG. 3, a DC control voltage 245 may be coupled to DC electrode 229 via DC input 247. Thus, signal portion SI is electrooptically modulated at RF electrode 237 by data signal 230 and is thermally modulated at DC electrode 229 by DC control voltage 245, which when applied to DC electrode 229 dissipates the power of DC control voltage 245 as heat by the inherent resistance of DC electrode 229. This heat is absorbed by substrate 218 in the area surrounding DC electrode 229, thereby causing a thermally induced local change in the refractive index of the substrate material. Through temperature coefficients, the local change in refractive index of modulator 218 is directly proportional to the Joule heating that occurs in the inherent resistance of DC electrode 229. By calibrating the amount of heat necessary to induce a change the refractive index, the operating point of modulator 200 can be controlled.

In comparison with the first embodiment, the second embodiment structure permits the resistance of second film 227 or DC electrode 229 to be more readily varied by changing the thickness of film 227. In other words, the resistance of DC electrode 229 is not limited by the RF nature of RF electrode 237. First and second films 235 and 227 are preferably formed of a metal layer, such as by way of nonlimiting example, gold, aluminum, tantalum nitrate or nickel chromium, but may be of any material having suitable conductivity.

Comparative Results

To test the premise of the invention, a modulator was constructed similarly to modulator 10 shown in FIG. 1. DC voltage was connected to electrode 37. As a result, the resistive path to ground passed through RF electrode 37 and then through terminal resistor 50. Typically, the center conductor or film 35 of RF electrode 37 has approximately four ohms of resistance, while the terminal resistance of resistor 50 is forty-three ohms, which totals approximately forty-seven ohms. This measurement was confirmed by measuring the resistance across RF electrode 37 and terminal resistor 50.

Figure 4:
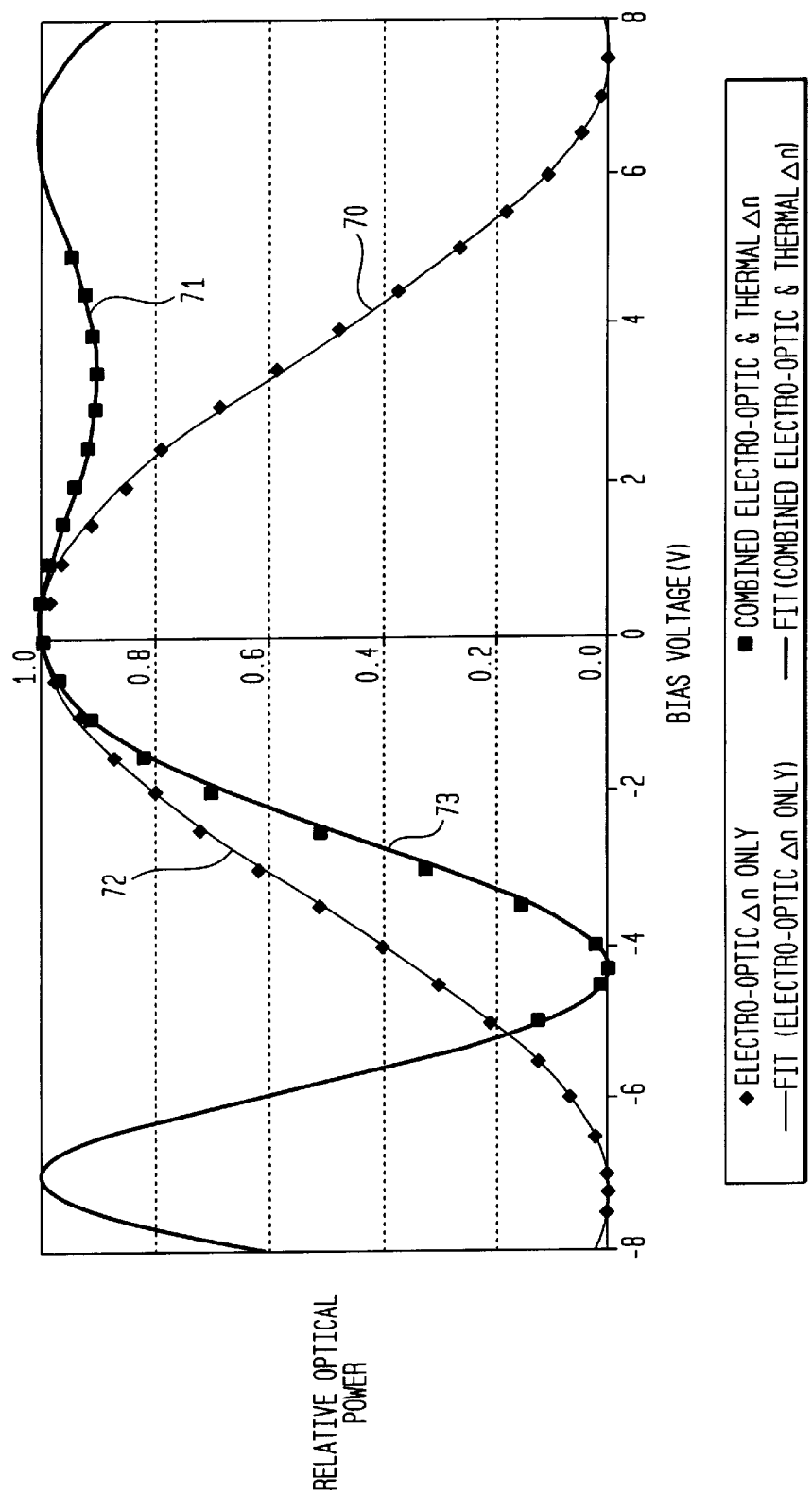
FIG. 4 is a chart of relative optical output power of the modulator shown in FIG. 2 plotted against the bias voltage.

The relative optical output power was measured at optical fiber 28 and was plotted against the applied voltage measured at DC input 47. The data was plotted on a graph depicted as FIG. 4 having an x-axis of bias voltage (V) and a y-axis of relative optical power. Line 70 was generated using only the electrooptic effect on DC electrode 19 (19 mm long). Line 71 was generated using the combined effect of electrooptic and resistive heating in electrode 37 (RF electrode 20 mm long).

As indicated by a solid line 70, the pure electrooptic response of modulator 10 exhibits the normal [1+cos ΔØ]/2 characteristic, where the phase change (ΔØ) is proportional to Δn and is linearly dependent on the voltage. Least squares fit yields:

$$\Delta\emptyset = -\pi[V_{DC}]/7.41 + 0.07 \text{ rad,} \tag{1}$$

corresponding to a switching voltage, $V_\pi = 7.41V$.

The combined response represented by line 71 still has the [1+cos ΔØ]/2 characteristic of line 70, but now ΔØ, through Δn, varies quadratically with the applied voltages.

$$\Delta\emptyset = \pi(V_{DC}/7.02)^2 - [V_{DC}]/7.24) + 0.10 \tag{2}$$

The phase change is written in this form to demonstrate that a voltage of 7.02V should give a thermal component of ΔØ equal to π, which is similar to the definition of $V_\pi$ for the electrooptic portion of the equation.

Thus, focusing on portion 73 of line 71 and portion 72 of line 70 ranging from a −4V to 0V, the slope of portion 73 is greater than the slope of portion 72, therefore indicating that the voltage sensitivity of the combined electrooptic and thermal change in refraction exceeds that of the change in refraction caused by the electrooptic effect alone.

The electrooptic contribution is negative and thus yields an increasing phase for a negative applied voltage. The thermal coefficient of the index for the extraordinary polarization can be calculated from the published Sellmeier relation (nπλ), which was given by Hobden and Warner in 1966.

$$dn/dT = 3.8 \times 10^{-5} \circ C.^{-1} \quad (3)$$

For a given modulator, $\Delta\varnothing = ([2\pi L]/\lambda_0) \Delta n$, where $\lambda_0 = 1.55$ μm and L=20,000 μm, where $\lambda_0$ is the initial signal wavelength and L is the length of the modulator. To yield a π phase shift we require:

$$\Delta n = \pi/(2\pi L/\lambda_0 = \lambda_0 2L = 1.55/2(20,000) = 3.9 \times 10^{-5} \quad (4)$$

Therefore, the required $\Delta T$ for $\Delta\varnothing = \pi$ is given by $\Delta T = 3.9 \times 10^{-5}/3.8 \times 10^{-5} C^{-1} = 1.0° C$. A temperature change of this magnitude is such that the device structure is not expected to appreciably degrade.

To estimate the electrical power dissipated in electrode 35, the current flow is given by:

$$I = [7.02 \text{ V}]/((43+4)\Omega) = 0.15 \text{ A}. \quad (5)$$

Thus, the Joule heating in the 4 ohm resistor of electrode 137 will be:

$$Q = I^2 R = (0.15 \text{ A})^2 (4 \text{ }\Omega) = 0.09 \text{ W} = 90 \text{ mW}. \quad (6)$$

Thus, the power dissipated in electrode 35 (90 mW) is relatively modest. Note that the power dissipation in resistor 50 is $(0.15 \text{ A})^2 (43 \text{ }\Omega) = 0.97 \text{ W} \simeq 1 \text{ W}$. Accordingly, the combined effect of electrooptic and thermally induced changes in the refractive index will not detrimentally affect modulator 10.

Using combined electrooptic- and thermal-induced changes to the refractive index of the modulator achieves substantial benefits. For example, the monotonically increasing bias voltage problem present in prior art modulators may be controlled as, where the prior art modulator operating point was set using an electrooptic Δn whose efficiency was time-dependent, an operating point set using a thermally induced Δn is independent of time. Therefore, where a combination of electrooptically induced and thermally induced Δn is used, as the electrooptic component of the refractive change recedes due to the screening effect, the thermal component can be made to increase until a predetermined point in time where the change in refractive index is attributable only to the thermal portion. In such a case, there is no need to increase the bias voltage due to screening effects. Accordingly, the life of a modulator may be prolonged.

Although the invention has been described primarily in connection with a Mach-Zehnder modulator configuration having a z-cut LiNbO$_3$ substrate, those skilled in the art will recognize that aspects of the present invention are applicable to x-cut (y- and z-propagation) modulators and other electrooptic device structures.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An optical device, comprising:

a substrate formed of an electrooptic material;

a waveguide formed in the substrate;

an electrically conductive film formed over at least a portion of the waveguide; and a source of DC bias voltage electrically connected to the film for thermally and electro-optically inducing a change in the optical refractive index of the substrate of the optical device.

2. The device according to claim 1, wherein the electrically conductive film is an electrode.

3. The device according to claim 2, the electrode is selected from the group consisting of a coplanar electrode, a stripe line electrode and an asymmetric electrode.

4. The device according to claim 2, comprising a resistor and wherein the electrode is terminated at the resistor.

5. The optic device according to claim 1, comprising: a bias tee electrically connected to the film and an electrical data signal and the source of DC voltage and the electrical data signal are electrically connected to the bias tee, the bias tee combining the source of DC voltage and the electrical data signal.

6. The optic device according to claim 1, wherein the device is a Mach-Zehnder interferometric modulator.

7. The optic device according to claim 1, wherein the device is a directional coupler.

8. The optic device according to claim 1, wherein the substrate comprises LiNbO$_3$.

9. The optic device according to claim 8, wherein the substrate is z-cut LiNbO$_3$.

10. The device according to claim 1, wherein the electrically conductive film consists essentially of a material selected from the group consisting of gold and aluminum.

* * * * *